United States Patent Office 2,725,083
Patented Nov. 29, 1955

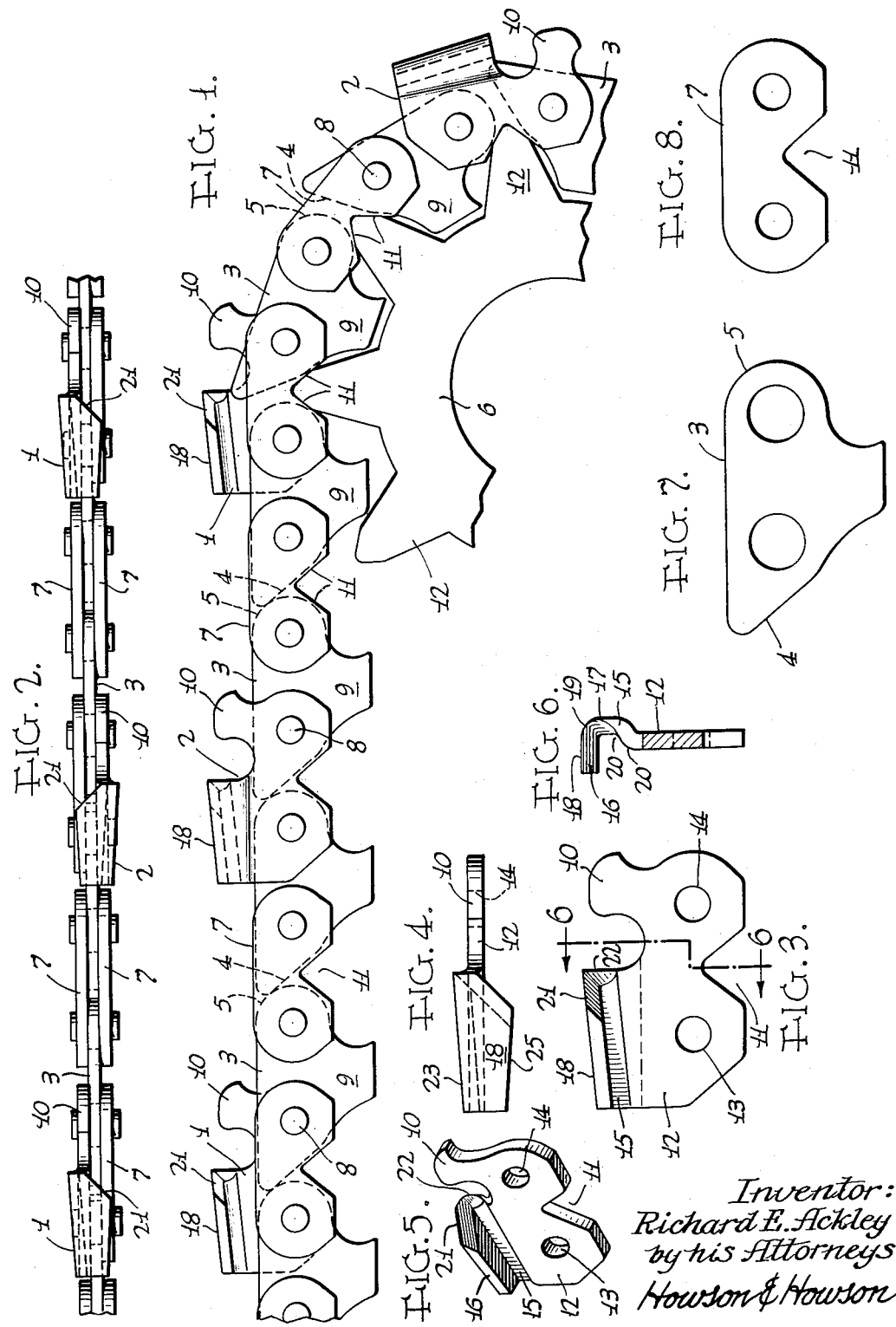

2,725,083

CUTTING CHAIN

Richard E. Ackley, Westmont, N. J., assignor to Henry Disston & Sons, Inc., Philadelphia, Pa., a corporation of Pennsylvania Application June 19, 1951, Serial No. 232,442

3 Claims. (Cl. 143—135)

This invention relates to improvements in cutting chains of the type used in chain saws, and a principal object of the invention is to provide a chain of this type having a relatively high functional efficiency and relatively low cost of manufacture.

A more specific object of the invention is to provide a cutting chain having a higher degree of stability in the cutting operation and greater overall strength than the corresponding chains of the prior art.

Still another object of the invention is to provide a cutting chain having relatively low maintenance cost.

A further object of the invention is to provide a cutting chain having pronounced straight cutting characteristics.

The invention contemplates also provision of a generally improved form of cutting link for chains of the stated type, said link being relatively inexpensive to manufacture and to resharpen.

The invention will be more readily understood by reference to the attached drawings in which—

Figure 1 is a side view of a section of cutting chain made in accordance with my invention, together with a segment of an associated drive sprocket;

Figure 2 is a top plan view of a portion of the chain illustrated in Figure 1;

Figures 3 and 4 are respectively side elevational and top plan views of one of the cutting links of the chain;

Figure 5 is a view in perspective of the cutting link;

Figure 6 is a sectional view on the line 6—6, Figure 3;

Figure 7 is a side view of one of the central links of the chain; and

Figure 8 is a side view of one of the side links which, with the cutting links, unite adjoining central links.

The invention relates to that type of cutting chain which employs a cutting tooth combining the dual function of scoring and routing. Such cutting teeth are known in the art as chisel teeth, and the chains in which they are incorporated as chisel chains. The characteristic feature of a cutting link or chain of this type is the approximately L-shaped form of the cutting tooth which comprises a shank portion having a transversely extending toe portion at its outer end, both the shank and toe portions having cutting edges which operate, respectively, on the side and bottom of the kerf formed by the chain in the work. Cutting chains employing composite chisel teeth of this character are relatively inexpensive to produce as compared with chains using conventional cutting teeth because of the elimination of separate teeth for performing the respective functions of cutting the sides and bottom of the kerf, it being less expensive to form the relatively few composite teeth than the multiple individual cutting teeth of the conventional chain. As heretofore designed, however, the chisel teeth either lacked stability in cutting or required production by forging. The forged tooth is relatively expensive as compared with a tooth capable of production by stamping from sheet metal. The present invention provides a form of chisel tooth and cutting link which may be manufactured at relatively low cost from metal plate, and which will have also the high degree of stability previously obtainable only in forged teeth.

With reference to the drawings, a chain made in accordance with my invention will comprise two series of cutter links 1 and 2, right and left hand respectively, and disposed on opposite sides of the cutting chain. In the illustrated embodiment the teeth 1 alternate longitudinally of the chain with the teeth 2. The teeth of the two series are identical, with the sole exception that they are reversed for operation on the opposite sides of the chain. The chain comprises, in addition to the cutter links 1 and 2, a series of links 3 arranged on the median plane of the chain and shown in Figure 7. These central links are arranged in longitudinal series with the inclined trailing edge 4 of each link in position to contact the rounded leading edge 5 of the next following link to prevent backward flexure of the chain as a whole beyond the normal straight line position shown at the left in Figure 1 of the drawings. This interengagement of the center link is such, however, as to permit the chain to flex freely in the opposite direction as required for its travel around the chain supporting sprocket 6 as shown at the right in Figure 1.

The proximate ends of the adjoining center links are connected by connector links 7 of the form shown in Figure 8, and by the cutter links previously described. The links 7 occur in pairs, at opposite sides respectively of the chain; and also in combination with and on the opposite side of the chain from each of the cutter links. The links are pivotally connected in each instance by pins 8 to provide the necessary articulation enabling it to pass around the supporting sprockets or a suitably rounded guide plate.

It will be noted that each of the center links is provided with an inwardly extending tongue 9 which is adapted to operate in the peripheral recess of a suitable guide plate for the chain in well known manner; and it will be noted also that each of the cutter links 1 and 2 and of the connector links 7 is provided at its inner edge with an angular recess 11, which is adapted to receive the outer ends of the sprocket teeth 12, as illustrated in Figure 1, to afford a driving connection between the chain and the sprocket. In the present instance the portions of the cutter and connector links which bound the edges of the recesses 11 overlap the proximate edges of the adjoining central links so that the contact between the teeth of the sprocket and the chain is confined entirely to the edges of the recesses 11 of the cutter and connector links.

The form of the cutter links 1 and 2 is well illustrated in Figures 4 to 6 inclusive. These links are produced from blanks stamped from metal plate of the required gauge and the body portions 12 of the link are flat and include at the leading end of the link an upward extension 10 the function of which will be described hereinafter. The body portion 12 is provided also at the opposite sides of the recess 11 with apertures 13 and 14 for reception of the pins 8 which pivotally secure the links in the chain assembly. The cutting tooth of the link comprises a shank portion 15, which is offset to one side of the body portion 12 of the plate, and a toe portion 16 which extends from the outer edge of the offset shank back over the plane of the body portion 12 and substantially at right angles to the said plane and to the offset shank 15. The outer face 17 of the shank 15 is flat and, as indicated, is substantially parallel to the plane of the body portion 12 of the link. The outer face 18 of the toe portion 16 is also flat and substantially at right angles to the plane of the face 17. The shank and toe portions are joined together by a rounded juncture 19 of small radius, the radius being as small as may be consistent with the operation of stamping the link from the metal blank. Similar small radius junctures 20, 20 connect the inner edge of the shank to the body of the link. The leading edges of the toe portion and of the immediately adjoining portion of the shank are bevelled inwardly to produce the cutting edge 21, of the tooth, the shank portion 22 of said edge terminating at a point approximately half way down the height of the forward edge of the shank.

As shown in Figures 3 and 4, the upper face 18 of the toe portion declines rearwardly toward the pitch line of the chain which intersects the centers of the apertures 13 and 14, so as to afford clearance for the cutting edge 21; and the outer face 17 of the shank slants inwardly from the forward edge toward the median plane of the body plate 12, thereby affording clearance for the cutting edge 22 of the shank. This pitch line comprises a continuous series of pitch lines of individual links i. e. a line intersecting the centers of the apertures of each link. The leading edge of the toe portion slants rearwardly from the shank at an angle of approximately 30 to approximately 45 degrees, and the free edge 25 of the toe portion is also preferably slanted rearwardly toward the median plane of the body plate 12. The shape of the cutting tooth is well illustrated in Figure 4.

It will be noted that the cutting edge 21 lies beyond the outer end of the extension 10 of the body plate or, in other words, the distance of the said cutting edge from a line intersecting the centers of the pivot holes 13 and 14 is slightly greater than the distance of the outer edge of the extension 10 from said line. The extension 10 constitutes in effect a gauge finger which by contact with the bottom of the kerf limits the extent to which the cutting edge 21 may enter the work material. Such gauge fingers have been found desirable to regulate the action of cutting teeth of the chisel type. It will be noted from examination of Figures 1 and 3 that the leading portion of each of the gauge fingers 10 is formed in a suitable radius to provide for a regulated reduction of interference between these gauges and the bottom of the kerf when the chain is operated in a mortising attitude, using the portion of the chain guided on the rounded end of a suitable guide plate.

In the operation of a cutting chain of the form described above, the flat side 17 of the shank 15 in conjunction with the flat outer surface of the toe portion 16 are effective stabilizing factors and serve to maintain the cutting tooth in normal cutting relation to the work without the pronounced tilting or twisting tendency experienced with commercial chisel teeth of other form. Smooth, straight line cutting is therefore characteristic of my cutting chain. The ability to produce the cutting link by stamping from a flat metal plate affords a material economy in manufacture. It will be noted further that the restriction of the cutting edge to the area of the shank immediately adjoining the toe affords a material economy in manufacture as limiting to a minimum the overall length of the cutting edge. It will be noted also that the cutting edge, which extends continuously from the outer end of the toe to the point of termination in the shank, is such as to be capable of sharpening by a single pass of a file of suitable form, preferably a flat file with rounded edges which conforms well to the angular shape of the cutting edge including the extended portion in the toe and the relatively limited portion in the shank. Maintenance costs are thus materially reduced. It will be noted that the use of a rounded edge flat file affords a flat or plane bevel on the toe 16. This is desirable in that the cutting edge with flat bevel exhibits considerably less tendency to gouge into the work material at the bottom of the kerf than does a concave or "hollow ground" bevel, and the cutting tooth will thereby have less tendency to imbed itself with possible stalling of the driving mechanism or breakage of the chain.

I claim:

1. A cutting tooth for cutting chains, said tooth being substantially L-shaped in form with a beveled cutting edge at one end extending continuously over the toe portion of the L and the immediately adjoining portion of the shank, the bevel of the toe being flat and the bevel of the shank being concave with the axis of the concavity paralleling the flat bevel of the toe.

2. A cutting tooth according to claim 1 wherein the cutting edge of the toe slants rearwardly from the cutting edge of the shank toward the trailing end of the tooth, said slanting edge forming an angle of from 30 to 45 degrees with a line normal to the line of travel of the tooth.

3. A cutting link for cutting chains, said link consisting of a flat body plate having a cutting tooth comprising a flat sided shank offset laterally from the plane of the body plate, and a flat toe portion extending from the outer end of said shank approximately in a plane at right angles to the body plate and back over the latter, the leading edges of the toe portion and of the adjoining part of the shank being bevelled to form a continuous cutting edge, the bevel at the edge of the toe portion being flat, the adjoining bevel on the shank concave, and the axis of concavity paralleling the flat bevel of the toe.

References Cited in the file of this patent

UNITED STATES PATENTS

| 1,732,692 | Peiseler | Oct. 22, 1929 |
| 2,485,962 | Entwisle | Oct. 25, 1949 |
| 2,508,784 | Cox | May 23, 1950 |
| 2,533,648 | Warburg et al. | Dec. 12, 1950 |
| 2,558,671 | Garrett | June 26, 1951 |